(12) United States Patent  (10) Patent No.: US 6,610,941 B2
Pfeiffer  (45) Date of Patent: Aug. 26, 2003

(54) BATTERY SIZE DETECTOR FOR A BATTERY CHARGER

(75) Inventor: J. David Pfeiffer, Hudson Heights (CA)

(73) Assignee: JDP Innovations Inc., Hudson Heights (CA)

(*) Notice: Subject to any disclaimer, the term of this patent is extended or adjusted under 35 U.S.C. 154(b) by 0 days.

(21) Appl. No.: 09/968,513

(22) Filed: Oct. 2, 2001

(65) Prior Publication Data

US 2003/0062251 A1 Apr. 3, 2003

(51) Int. Cl.[7] .................................................. H01H 9/00
(52) U.S. Cl. ............................. 200/61.58 R; 200/17 R; 200/18; 320/110
(58) Field of Search .................................. 200/17 R, 18, 200/61.58 R; 320/2–6, 15–18, 31, 32, 110

(56) References Cited

U.S. PATENT DOCUMENTS

| | | | | |
|---|---|---|---|---|
| 3,579,075 A | * | 5/1971 | Floyd | 320/110 |
| 4,101,818 A | * | 7/1978 | Kelly et al. | 320/110 |
| 4,403,182 A | | 9/1983 | Yeh | |
| 4,766,361 A | * | 8/1988 | Pusateri | 320/110 |
| 4,816,735 A | | 3/1989 | Cook et al. | |
| 5,057,761 A | | 10/1991 | Felegyhazi, Sr. | |
| 5,543,702 A | * | 8/1996 | Pfeiffer | 320/110 |
| 5,606,238 A | | 2/1997 | Spellman et al. | |
| 5,686,811 A | | 11/1997 | Bushong et al. | |

FOREIGN PATENT DOCUMENTS

DE          1940911          2/1970 ............. H02J/7/02

* cited by examiner

Primary Examiner—Michael Friedhofer
(74) Attorney, Agent, or Firm—James Anglehart; Ogilvy Renault

(57) ABSTRACT

The battery charger provides a current to a battery depending on its type. The type of the battery is determined using, a two-pronged fork and a pusher slider assembly which may actuate two switches using a spring leaf. The two switches enable to provide a current depending on the type of battery. AAA-type, AA-type, C-type and D-type batteries may be used. The battery charger also enables to easily position the battery in the battery charger.

16 Claims, 8 Drawing Sheets

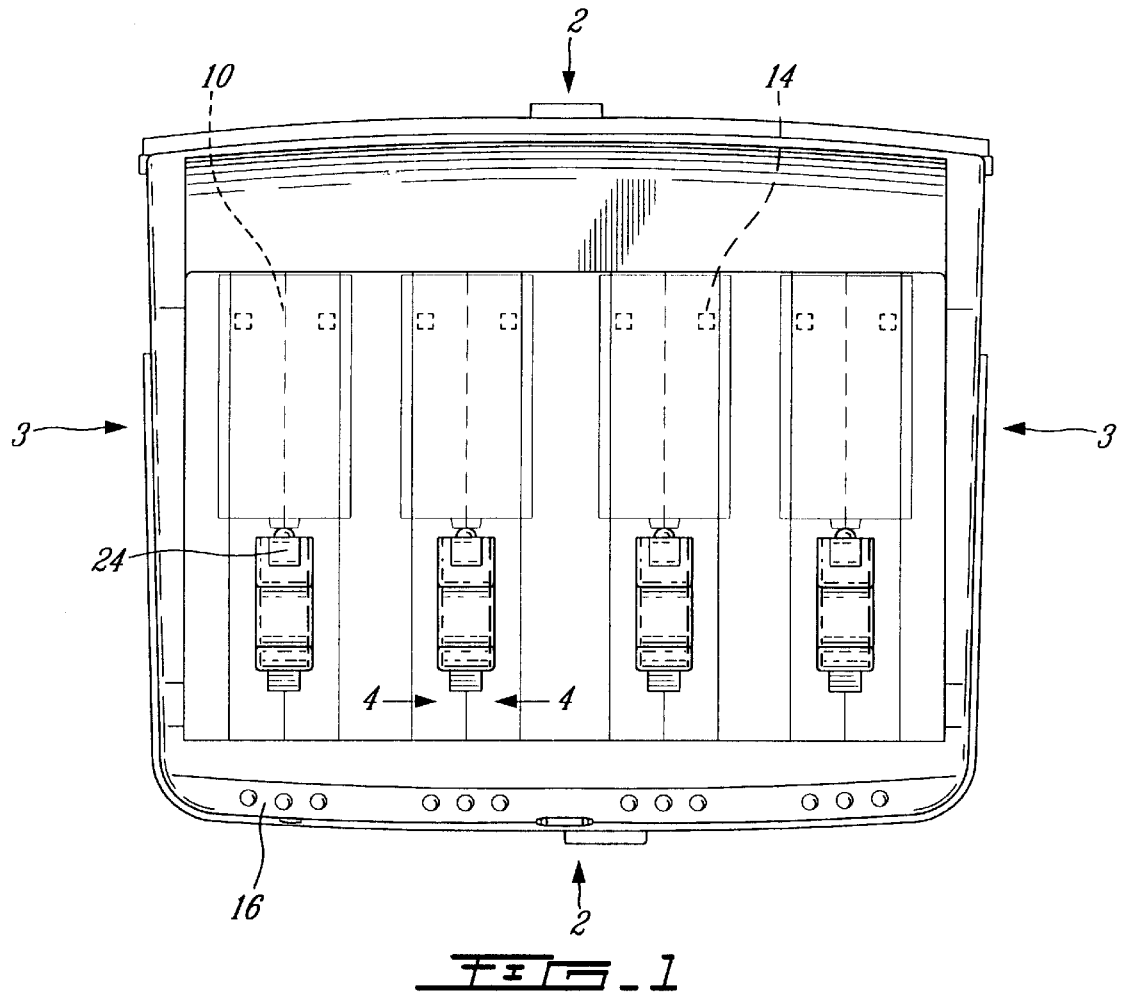
FIG_1
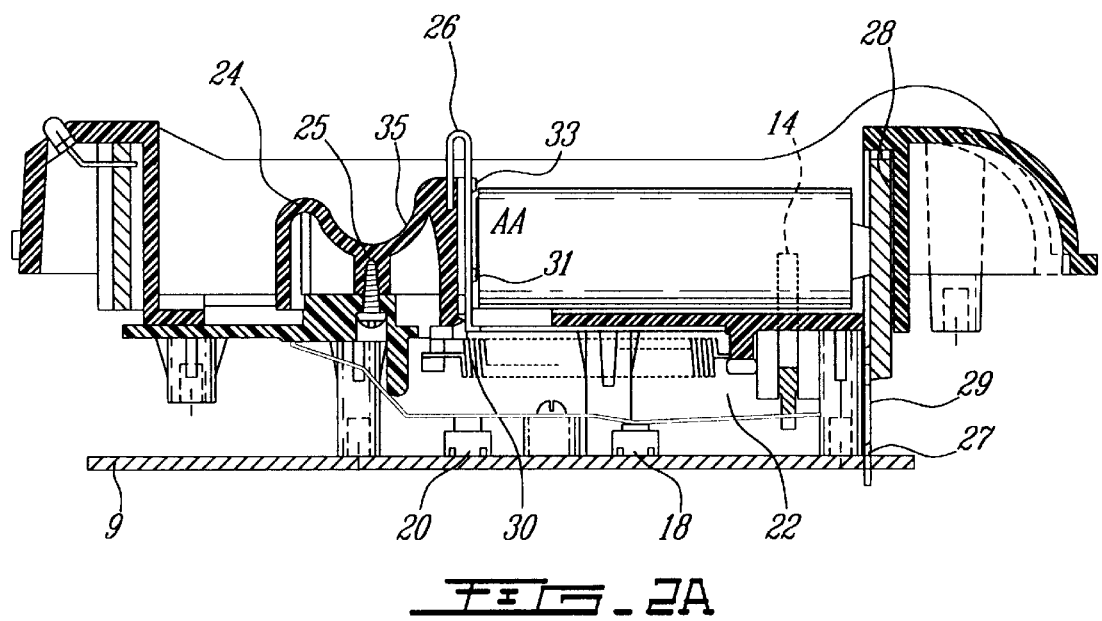
FIG_2A

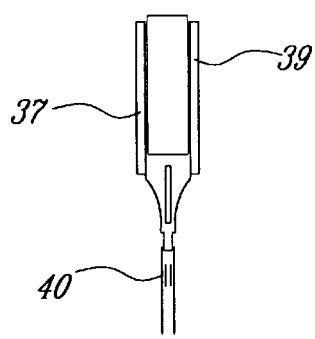
FIG_2D
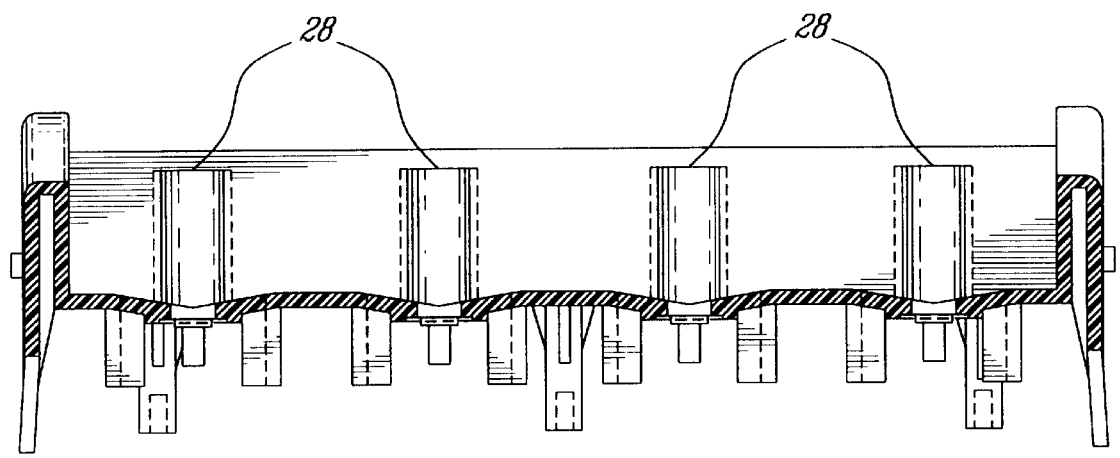
FIG_3A
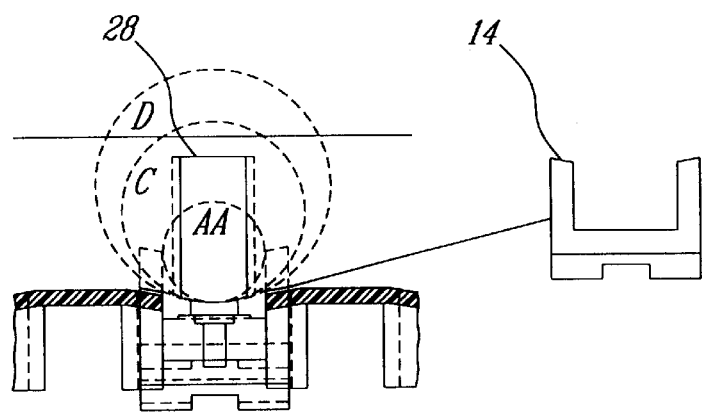
FIG_3B

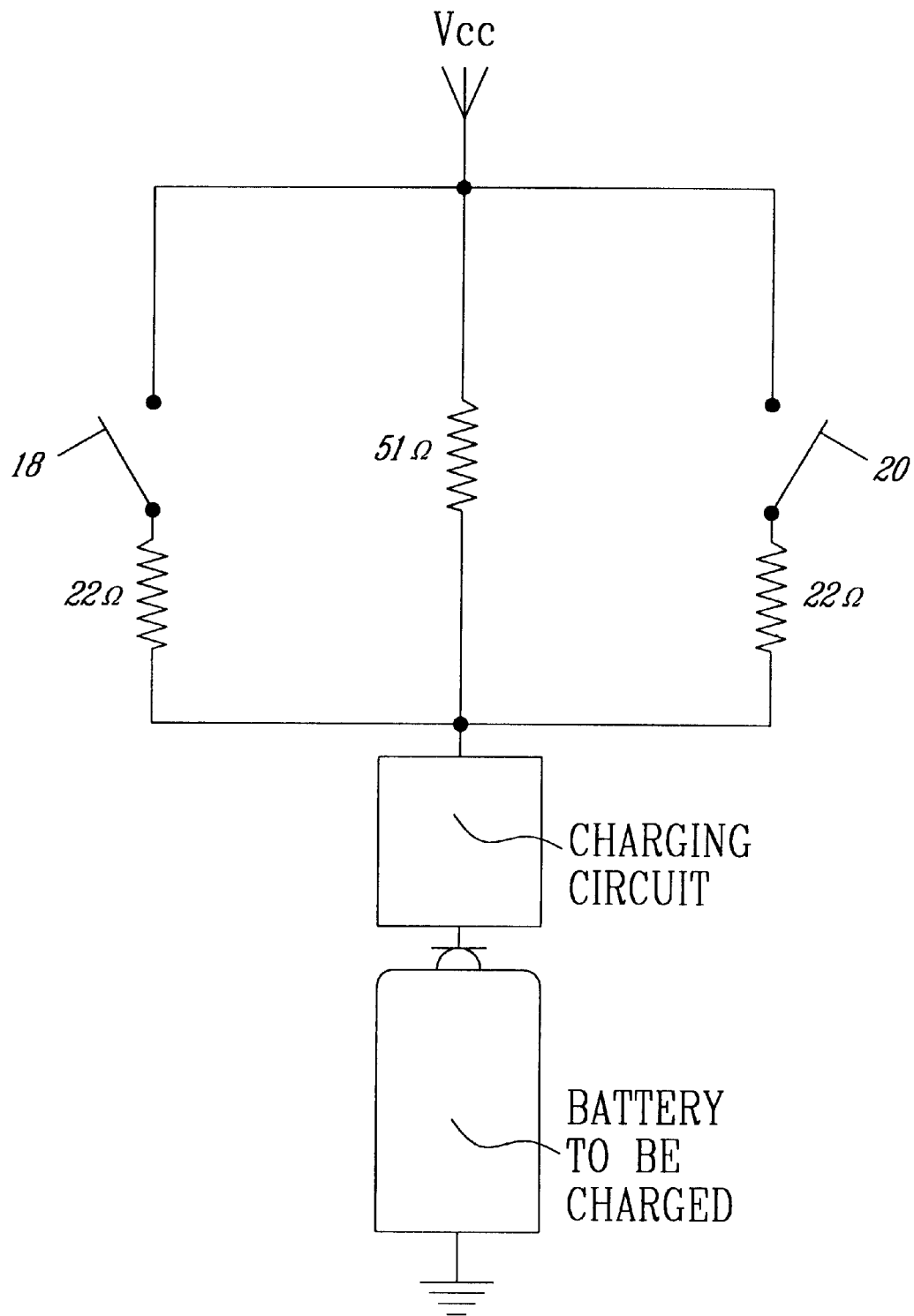
FIG_4

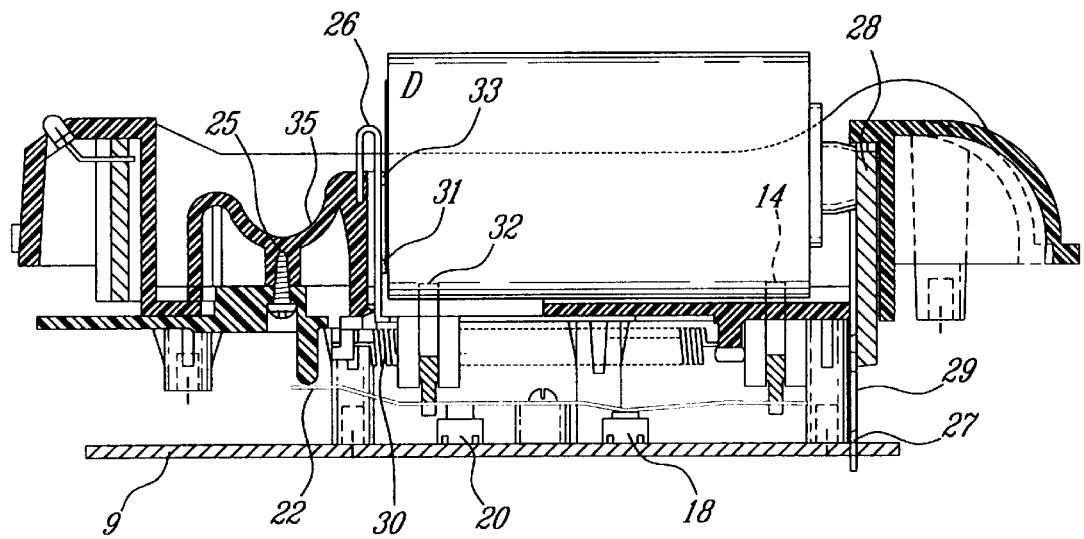
FIG_5
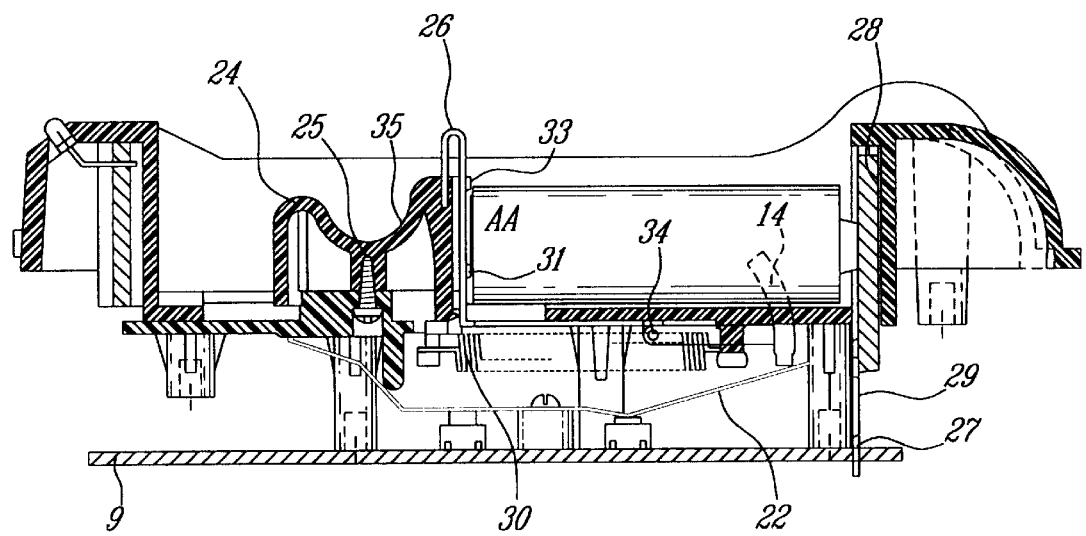
FIG_6A

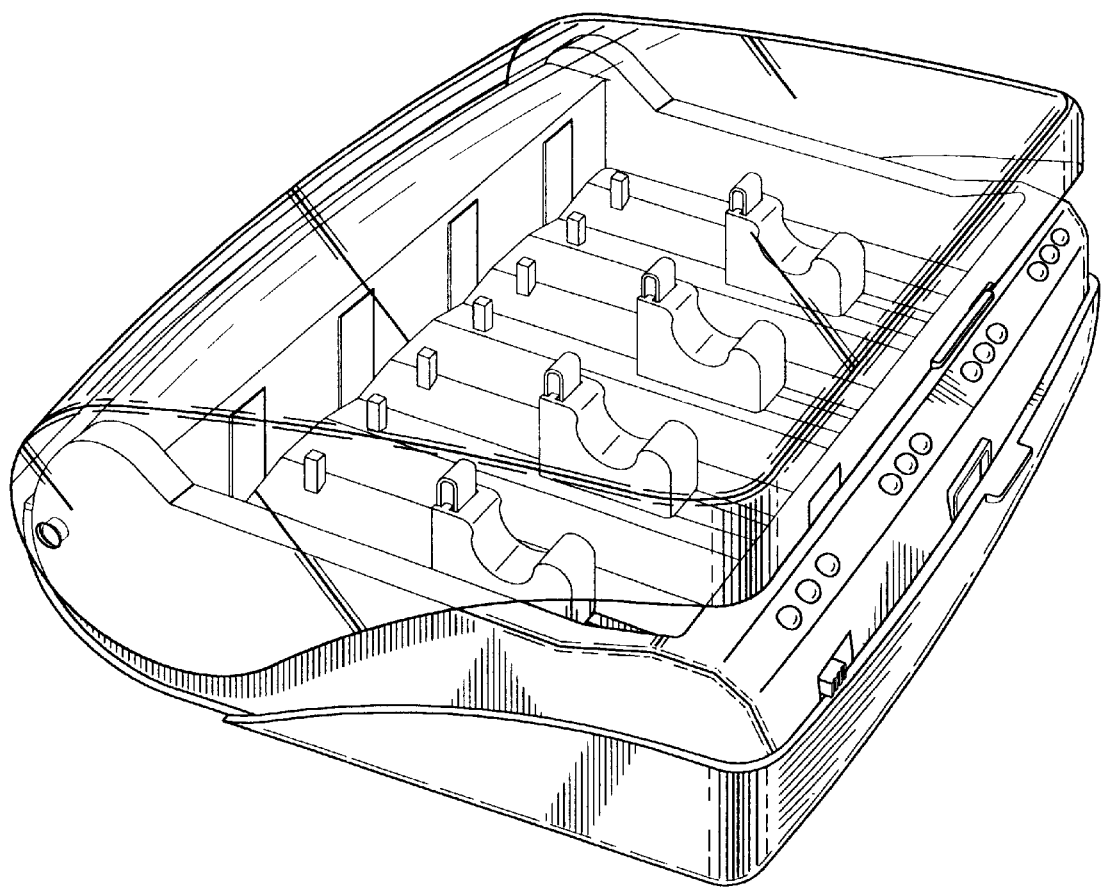
FIG_8B

BATTERY SIZE DETECTOR FOR A BATTERY CHARGER

FIELD OF THE INVENTION

This invention pertains to the field of battery chargers. More precisely, this invention enables a battery charger to provide automatically the current needed by a battery depending on its size.

BACKGROUND OF THE INVENTION

A battery charger is a very convenient tool; it enables people to reuse their batteries and to be therefore able to use efficiently their preferred electronic devices. From the environmental point of view, a battery charger helps fight against the pollution by reducing the number of batteries required.

Preferably, a battery charger is intended to be as universal as possible, meaning that a user could decide to use the battery charger to charge a battery of any size from AAA-type to D-type. Unfortunately, batteries with different sizes have different charging current needs. A large battery such as a D-type battery will require more current than an AA-type battery or AAA-type battery. Detecting automatically the size of a battery inserted in the battery charger is highly desirable in order to provide a suitable current.

Various battery chargers have been disclosed in the past; for instance U.S. Pat. No. 5,543,702 discloses an alkaline battery charging method and a battery charger.

In the '702 patent, the battery size detection is made by a slide with a V-shape fitting against the radius of curvature of the battery's case, and moving out radially. The movement closes a series of three different switches. When an AAA-type battery is inserted or when no battery is inserted, no switch is closed. When an AA-type battery is inserted, a first switch is closed. A second switch is further closed when a C-type battery is inserted and a third switch is further closed when a D-type battery is inserted. These switches are used to vary the amount of resistance in the emitter leg of an emitter follower constant current charging source, causing the current to increase with decreasing resistance. The disclosed charger achieves the goal of providing automatically a current that depends on the physical size of the battery, however the radial motion of a V-shaped slide is extremely difficult to implement when the available space is limited. Furthermore, the charger in the '702 patent requires a steady member for electrical contact with each battery and the V-shape slide. Both construction of the charger and use are somewhat complicated. There is therefore a need for detecting automatically the size of a battery that will overcome the above-mentioned drawbacks.

SUMMARY OF THE INVENTION

It is an object of the invention to provide a method and apparatus to recharge batteries of various sizes, such as AAA, AA, C and D.

It is an object to provide a battery charger that makes battery positioning with respect to terminal contacts easier and more secure.

According to one object of the invention, there is provided a battery charger receiving at least one battery horizontally on a support surface and having at least one switch detecting a variable battery size and a charging circuit responsive to said at least one switch, characterized in that said switch comprises a first pair of depressible posts, the first pair of depressible posts biased with respect to the support surface of the battery charger, said posts being spaced to guide the battery therebetween to be centrally positioned on the support surface and be depressed depending on a size of the battery.

BRIEF DESCRIPTION OF THE DRAWINGS

The invention will be better understood by way of the following description of the preferred embodiment, together with the accompanying drawings, in which:

FIG. 1 is a top view of a portion of the battery charger;

FIG. 2A is a sectional view of the battery charger of FIG. 1 taken along line 2—2, the battery charger handles in this configuration a AA-type battery;

FIG. 2D is a view of the second contact.

FIG. 3A is a sectional view of the battery charger of FIG. 1 taken along line 3—3;

FIG. 3B is a sectional view of the battery charger of FIG. 1 taken along line 4—4;

FIG. 4 is a schematic diagram which shows the battery size determining arrangement according to the invention which automatically connects selected resistance into a constant current circuit corresponding to the size of the battery connected to the battery holder for that constant current circuit;

FIG. 5 is a sectional view of another embodiment of the invention.

FIG. 6A shows another embodiment of the invention where the two-pronged fork pivots around an axis; an AA-type battery is inserted in this embodiment.

FIG. 8B is another perspective view of the preferred embodiment of the invention.

DESCRIPTION OF THE PREFERRED EMBODIMENT

Figure 2B:
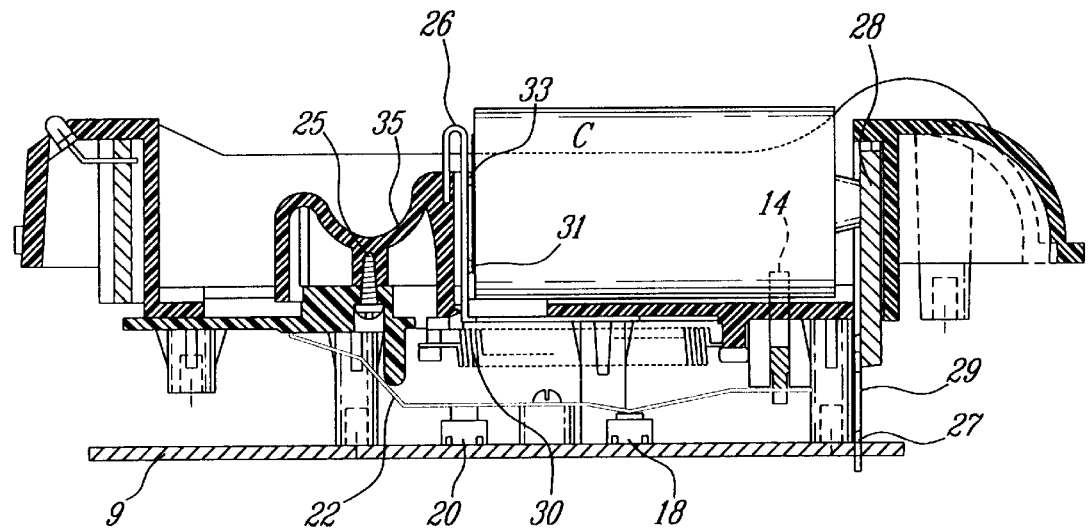
FIG. 2B is a sectional view of the battery charger of FIG. 1 taken along line 2—2, the battery charger handles in this configuration a C-type battery.

AAA-type, AA-type, C-type and D-type battery denomination will be used in the following description. However, those skilled in the art will note that LR03, LR6, LR14, and LR20 as well as UM4, UM3, UM2, and UM1 could alternatively be used to designate a type of battery.

Now referring to FIG. 1, there is shown a battery charger in the preferred embodiment of the invention. The battery charger may hold up to four batteries. In this embodiment of the invention, the battery charger may detect automatically the size of each of the four batteries 10 using a pusher slider assembly 24 and a two-pronged fork 14. A set of LED 16 may indicate the status of charge for each of the four batteries.

Now referring to FIG. 2A, there is shown a sectional view of the charger unit. In this sectional view, an AA-type battery is inserted.

A two-pronged fork 14 may be pushed down when a battery with a diameter greater than the distance between the prongs is inserted in the charger. In the preferred embodiment of the invention, the two prongs of the two-pronged fork 14 are spaced so that a AA-type battery or a smaller diameter battery will pass between the prongs with clearance, while a larger diameter will urge the two-pronged fork 14 to move downward. In the preferred embodiment, the distance between the prongs is 0.584 inch (1.48336 cm). A flexible leaf spring 22 provides an upward force on the two-pronged fork 14. The flexible leaf spring 22 pushes a first low force tactile switch 18 and a second low force tactile switch 20 located beneath the flexible leaf spring 22 whenever the first end or the second end of the flexible leaf spring 22 is pushed downward.

In the preferred embodiment of the invention, the first and the second tactile switches are similar in size and function to the Panasonic switches EVQ-PAD04M, actuated by a force of between 0.28 to 0.50 pounds (1.25 to 2.28 Newtons).

The first, right end of the flexible leaf spring 22 is pushed downward when the two-pronged fork 14 moves downward.

A pusher slider assembly 24 may move horizontally. The pusher slider assembly 24 comprises a contact 26 for electrically contacting the negative end of the battery.

A second contact 28 located on the battery charger is intended for electrically contacting the positive end of the battery. In the preferred embodiment of the invention, the second contact 28 has an inwardly curved surface which maintains the positive button of the battery in a central position. In the preferred embodiment, the inwardly curved surface has a radius of 0.5 inch (1.27 cm). In the preferred embodiment of the invention, the second contact 28 has two side-projecting flanges 37, 39, 0.430 inch (1.0922 cm) wide, that guide the contact in its socket 40 and hold it in place. The narrow tip is further reduced to 0.054 inch (0.13716 cm) width, and this 0.054×0.010 inch (0.13716×0.0254 cm) piece goes through a hole 27 in the printed circuit board and is soldered to its printed circuit conductor on the lower side of the printed circuit board; the second contact 28 may then be removed from the pocket in the case without unsoldering, by pulling the printed circuit board assembly straight down until the second contact 28 is out of the pocket.

A tension spring 30, which pulls the pusher slider assembly 24 against the second contact maintains the battery between the first contact 26 and the second contact 28 and creates an electric contact between the positive end of the battery and the second contact 28 as well as an electric contact between the negative end of the battery and the first contact 26. It will be appreciated by someone skilled in the art that the inwardly curved surface which maintains the positive button of the battery enables the battery to stay in a stable horizontal position.

The first contact 26 comprises two dimples to press against the negative end of the battery. The lower dimple contact is active for AA-type batteries and AAA-type batteries, while the upper dimple is used with C-type batteries and D-type batteries.

A 180-degree bend at the top of the contact anchors it to the pusher slider assembly 24 by fitting into a pocket moulded into the top of the pusher slider assembly 24. A wider plate at the base stabilizes the pusher slider assembly against tilting backward when the tension spring 30 pulls it forward. It also acts as a slot cover for the forward section of the pusher slider assembly 24. A flexible wire loop connects contact 26 to the printed circuit board 9.

In the preferred embodiment, the pusher slider assembly 24 comprises first and second halves which are fastened together using a screw 25.

In the preferred embodiment of the invention, the pusher slider assembly 24 comprises a curved finger recess 35 for its manual operation. In the preferred embodiment, the radius of the curved finger recess 35 is 0.218 inch (0.55372 cm).

The second end of the flexible leaf spring 22 is pushed downward when the pusher 24 moves beyond a certain distance. In the preferred embodiment of the invention, the second end of the flexible leaf spring 22 is pushed downward when a battery longer than a C-type battery is inserted. Still referring to FIG. 2A, the drawing shows a configuration where an AA-type battery is inserted. This configuration is similar to the configuration where an AAA-type battery is inserted in the battery charger. In these configurations, the two-pronged fork 14 is in its upward position, pushed by the flexible leaf spring 22. Furthermore, the pusher slider assembly 24 is positioned far enough toward the right so that the left side of the flexible leaf spring 22 is not deflected. In this configuration no switches are actuated. In this configuration, the two-pronged fork 14 guides the battery in a resting position, as the battery is inserted between the two prongs of the two-pronged fork.

Now referring to FIG. 2B, there is shown a configuration where a C-type battery is inserted. In this configuration, the two-pronged fork 14 is pushed down, causing the right end of the flexible leaf spring 22 to deflect and actuate the switch 18 located underneath. However, as the length of a C-type battery is similar to that of an AA-type battery, the switch 20 is therefore not actuated. In this configuration, the two-pronged fork 14 guides the battery in an at rest position. The battery is placed over the two prongs of the two-pronged fork 14. The two prongs help to center the battery. Then the battery, because of its diameter, pushes down the two-pronged fork 14; at this time, the battery is placed in a well-centered position.

Figure 2C:
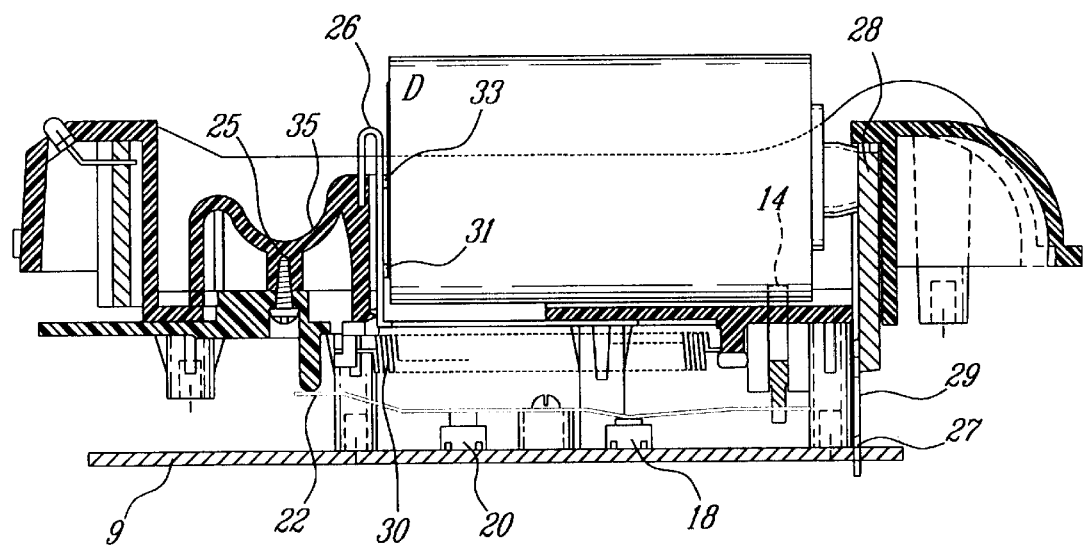
FIG. 2C is a sectional view of the battery charger of FIG. 1 taken along line 2—2, the battery charger handles in this configuration a D-type battery.

Now referring to FIG. 2C, there is shown a configuration where a D-type battery is inserted. In this configuration, the two-pronged fork 14 is pushed down, causing the right end of the flexible leaf spring 22 to deflect and actuate the switch 18 located underneath. Furthermore, the pusher slider assembly 24 moves to the left due to the length of a D-type battery, causing the left part of the flexible leaf spring 22 to be pushed down, tripping the switch 20. In this configuration, the two-pronged fork 14 guides the battery in an at rest position. The battery is placed over the two prongs of the two-pronged fork 14. The two prongs help to center the battery. Then the battery, because of its diameter, pushes down the two-pronged fork 14; at this time, the battery is placed in a well-centered position.

It will be appreciated by those skilled in the art, that switches 18 and 20 may be actuated by the operator during the process of inserting a new battery, for instance if the operator moves the pusher slider assembly 24 to the left far enough in order to insert the battery. However, the only switches that will affect the current which will flow through the battery are those switches which remain closed when the battery is making contact with both the negative contact (first contact 26) and the positive contact (second contact 28). The desired current determined by a configuration of the switches 18 and 20 is only provided to the inserted battery when electrical contacts are set-up, i.e. when the appropriate switch configuration is set.

Now referring to FIG. 3A, there is shown a sectional view of the battery charger, the four batteries of the battery charger rest, in the preferred embodiment of the invention, in shallow gutters, defined by two 10-degree angles, with the positive contacts located in the vertical front wall of the unit.

Now referring to FIG. 3B, there is shown a sectional view of one of the locations where a battery rests. In this sectional view, the two-pronged fork 14 is superimposed, and the outlines of various battery sizes are drawn in. In the preferred embodiment of the invention, when a D-type battery pushes down the two-pronged fork 14, the notch at the bottom of the two-pronged fork 14 moves to a distance of 0.425 inch (1.0795 cm). The C-type battery moves the notch to a distance of 0.390 inch (0.9906 cm) while an AA-type or an AAA-type battery does not move the notch beyond its rest position of 0.200 inch (0.508 cm).

A schematic diagram is shown in FIG. 4. In this diagram, there is shown how switches 18 and 20 influence the current provided. When switches 18 and 20 are open i.e. when no battery, or when an AA-type battery is inserted or when an AAA-type battery is inserted, the resistance provided is 51Ω. When the two-pronged fork 14 makes the switch 18 close, a resistance of 22Ω is added in parallel to the resistance of 51Ω, resulting in an equivalent resistance of 15.37Ω; this is the case when a C-type battery is inserted. When switch 20 is also actuated, a resistance of 22Ω is added in parallel to the resistance of 51Ω and to the resistance of 22Ω, resulting in an equivalent resistance of 9.05Ω; this is the case when a D-type battery is inserted. In the preferred embodiment, a circuit equivalent to the one presented in U.S. Pat. No. 5,543,702 is used to provide the current. The current provided, in response to the equivalent resistance, will depend upon the emitter follower characteristics of the circuit presented in the above-mentioned patent. However, a 16 mA current will be approximately provided to an AA-type or an AAA-type battery, a 53 mA current will be approximately provided to a C-type battery and a current of 90 mA will be approximately provided to a D-type battery.

Now referring to FIG. 5, there is shown another embodiment of the invention. In this embodiment, a second fork 32 may be pushed down, causing the left end of the flexible leaf spring 22 to deflect and actuate the switch 20 located underneath. In this embodiment, the second fork 32 is located at a distance larger than the length of a C-type battery from the second contact. In another alternative embodiment, the second fork 32 may also be a single depressible post; in such embodiment the single depressible post is located at a distance larger than the length of a C-type battery from the second contact. The two two-pronged forks can thus be positioned, preferably, at opposed ends of an AA-type battery so as to help center batteries being positioned thereon or therebetween.

In another alternative embodiment, another two-pronged fork may be used, in this alternative embodiment, the distance between the two prongs of the two-pronged fork is larger than the diameter of a C-type battery. The first two-pronged fork helps to discriminate between an AAA-type battery or an AA-type battery and a C-type battery, while the second two-pronged fork helps discriminate between a C-type battery and a D-type battery.

Now referring to FIG. 6A, there is shown an alternative embodiment in which the two-pronged fork 14 pivots around an axis 34 when it is pushed down by a battery larger than an AA-type or an AAA-type battery. In this configuration an AA-type battery is inserted; the fork is not pushed down.

Figure 6B:
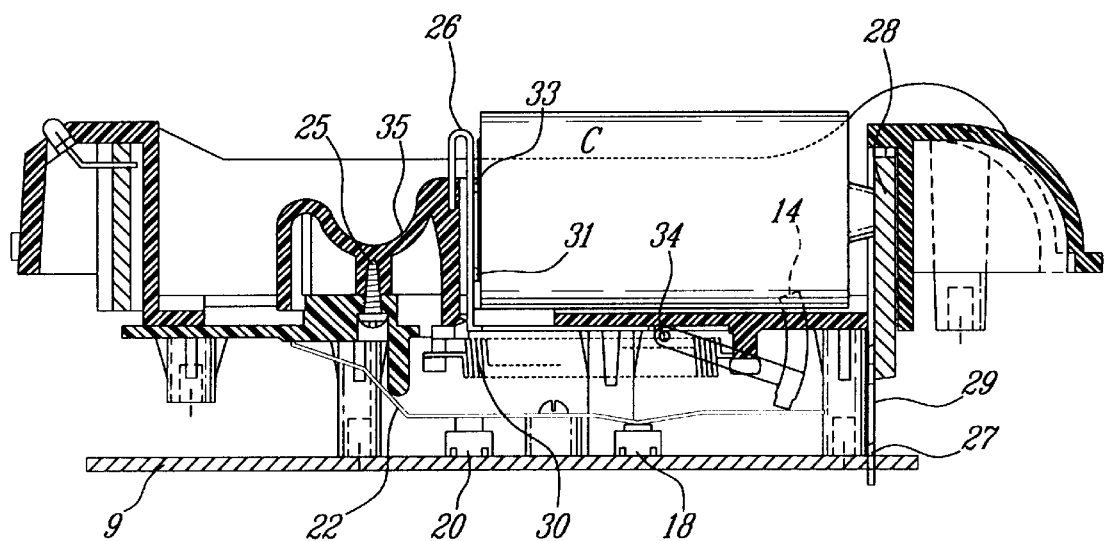
FIG. 6B shows another embodiment of the invention where the two-pronged fork pivots around an axis; a C-type battery is inserted in this embodiment.

In FIG. 6B, a C-type battery is inserted causing the fork to be pushed down.

It will be appreciated, by those skilled in the art, that two single posts may be used instead of a two-pronged fork. One of the two single posts being connected to a switch. However, the two single posts may be less interesting to use as the two-pronged fork provides a guide for positioning the battery.

Figure 7:
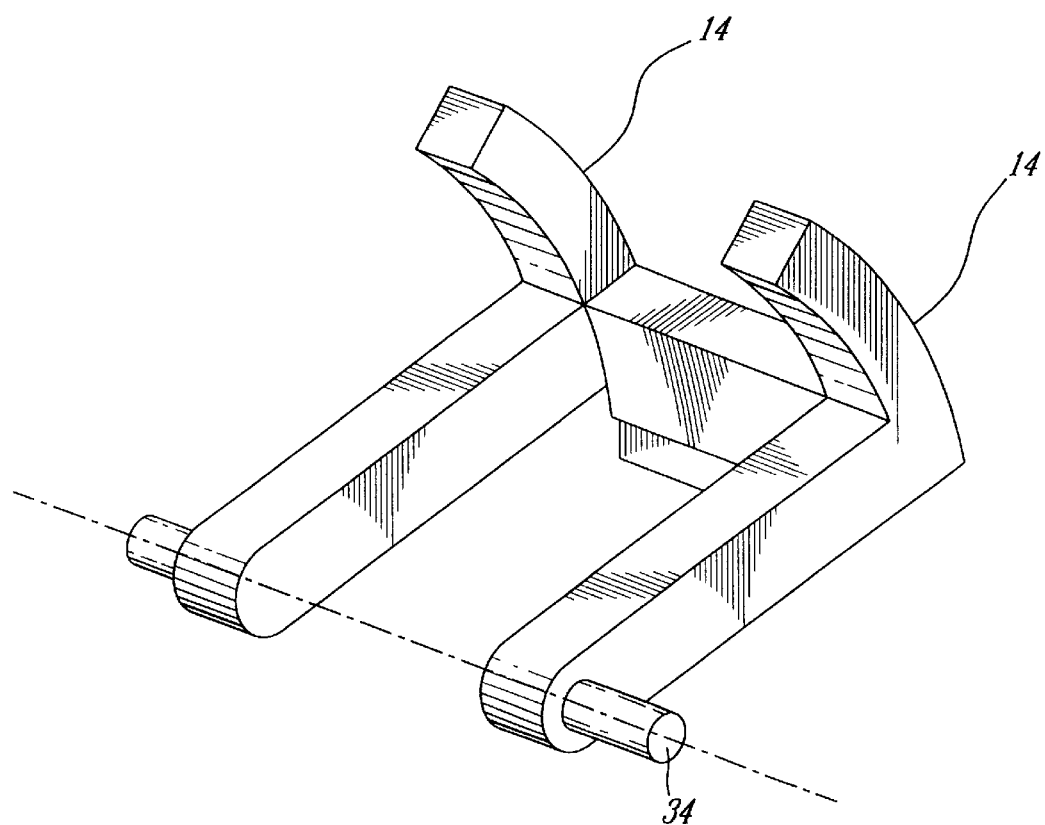
FIG. 7 is a perspective view of the two-pronged fork which pivots around an axis.
Figure 8A:
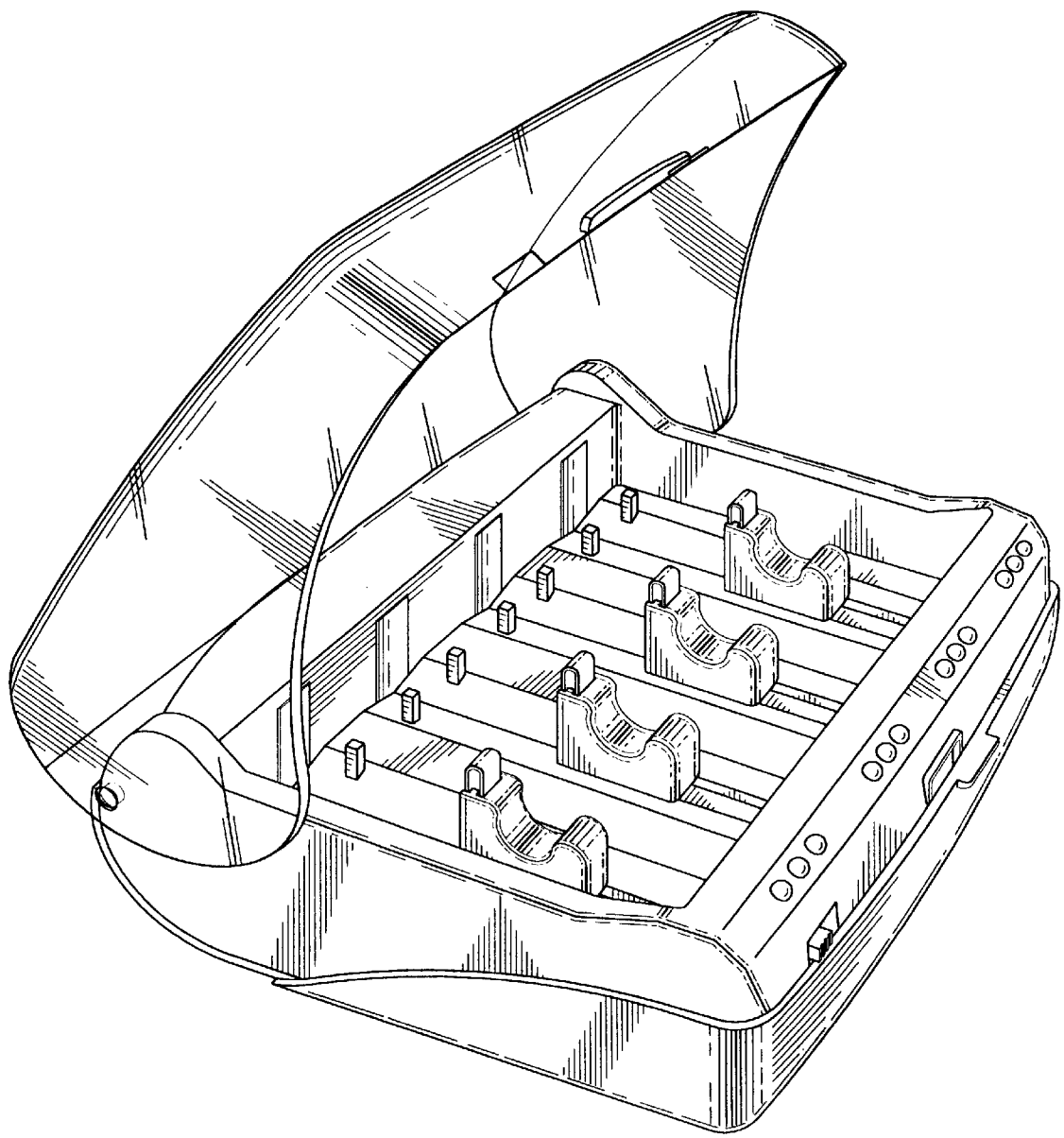
FIG. 8A is a perspective view of the preferred embodiment of the invention.

Now referring to FIG. 7, there is shown the two-pronged fork 14 used in the alternative embodiment described in FIGS. 6A and, FIG. 8A and FIG. 8B show a perspective view the preferred embodiment of the battery charger.

What is claimed is:

1. A battery charger receiving at least one battery horizontally on a support surface and having at least one switch detecting a variable battery size and a charging circuit responsive to said at least one switch, characterized in that:
    said switch comprises a first pair of depressible posts, the first pair of depressible posts biased with respect to the support surface of the battery charger, said posts being spaced to guide the battery therebetween to be centrally positioned on the support surface and be depressed depending on a size of the battery.

2. The battery charger as claimed in claim 1, wherein the first pair of depressible posts is provided by a two-pronged fork, the two-pronged fork actuating a first switch and a biasing action of the fork helping to center the battery when depressed.

3. The battery charger as claimed in claim 2, wherein said two-pronged fork moves in a vertical plane to said support surface to actuate said first switch.

4. The battery charger as claimed in claim 3, wherein said two-pronged fork pivots about a fixed axis, moving rotatively in a substantially vertical plane, to actuate said first switch.

5. The battery charger as claimed in claim 1, further comprising a second switch, the second switch being actuated by a moveable part, the moveable part maintaining said battery electrically connected with said battery charger.

6. The battery charger as claimed in claim 5, wherein said second switch is being actuated using a spring leaf, the spring leaf being connected to the second switch and to the moveable part, the moveable part making the spring leaf pivot and actuating said second switch when the moveable part reach a certain position.

7. The battery charger as claimed in claim 6, wherein said first switch discriminates between a AAA-type battery or a AA-type battery and a C-type battery, further wherein said second switch discriminates between a C-type battery and a D-type battery.

8. The battery charger as claimed in claim 1, further comprising a second pair of depressible posts actuating a second switch of the at least one switch if a battery larger than the distance between the second pair of depressible posts is inserted in the battery charger, the distance between said first pair of depressible posts and said distance between said second pair of depressible posts being substantially different in order to discriminate at least three types of batteries.

9. The battery charger as claimed in claim 8, wherein said second pair of depressible posts is provided by a second two-pronged fork, the second two-pronged fork actuating said second switch.

10. The battery charger as claimed in claim 1, further comprising another depressible post located on said support surface, the other depressible post actuating a second switch if a battery is inserted over it, the other depressible post being located at a predetermined distance from said first pair of depressible posts, the predetermined distance enabling to discriminate between two types of batteries, wherein at least three types of batteries may be discriminated.

11. The battery charger as claimed in claim 10 wherein said at least three types of batteries comprise AA-type battery or AAA-type battery, C-type battery and D-type battery.

12. The battery charger as claimed in claim 9, wherein said second two-pronged fork moves in a vertical plane to said support surface to actuate said second switch.

13. The battery charger as claimed in claim 12, wherein said second two-pronged fork pivots about a fixed axis, moving rotatively in a substantially vertical plane, to actuate said second switch.

14. The battery charger as claimed in claim 1, wherein a switch of the at least one switch is a tactile switch.

15. The battery charger as claimed in claim 1, wherein a non-moveable conductive element connected to a terminal of the battery extends perpendicularly to the printed circuit board, the conductive element being connected to the printed circuit board by bonding to it in an electrically conductive joint.

16. The battery charger as claimed in claim 15, wherein said non-moveable conductive element connected to a terminal of the battery has an inwardly curved surface in order to center the battery.

* * * * *